Dec. 6, 1966 D. W. NEILD 3,290,675

IDENTIFICATION SYSTEMS

Filed July 6, 1964 2 Sheets-Sheet 1

INVENTOR

DONALD WILLIAM NEILD

BY Kirschstein, Kirschstein and Ottinger

ATTORNEYS

Dec. 6, 1966 D. W. NEILD 3,290,675

IDENTIFICATION SYSTEMS

Filed July 6, 1964 2 Sheets-Sheet 2

INVENTOR
Donald William Neild
BY Kirschstein, Kirschstein and Ottinger
ATTORNEYS 3,290,675
IDENTIFICATION SYSTEMS
Donald W. Neild, Gatley, England, assignor to The General Electric Company Limited, London, England
Filed July 6, 1964, Ser. No. 380,694
Claims priority, application Great Britain, July 5, 1963, 26,734/63
5 Claims. (Cl. 343—6.5)

Figure 1:
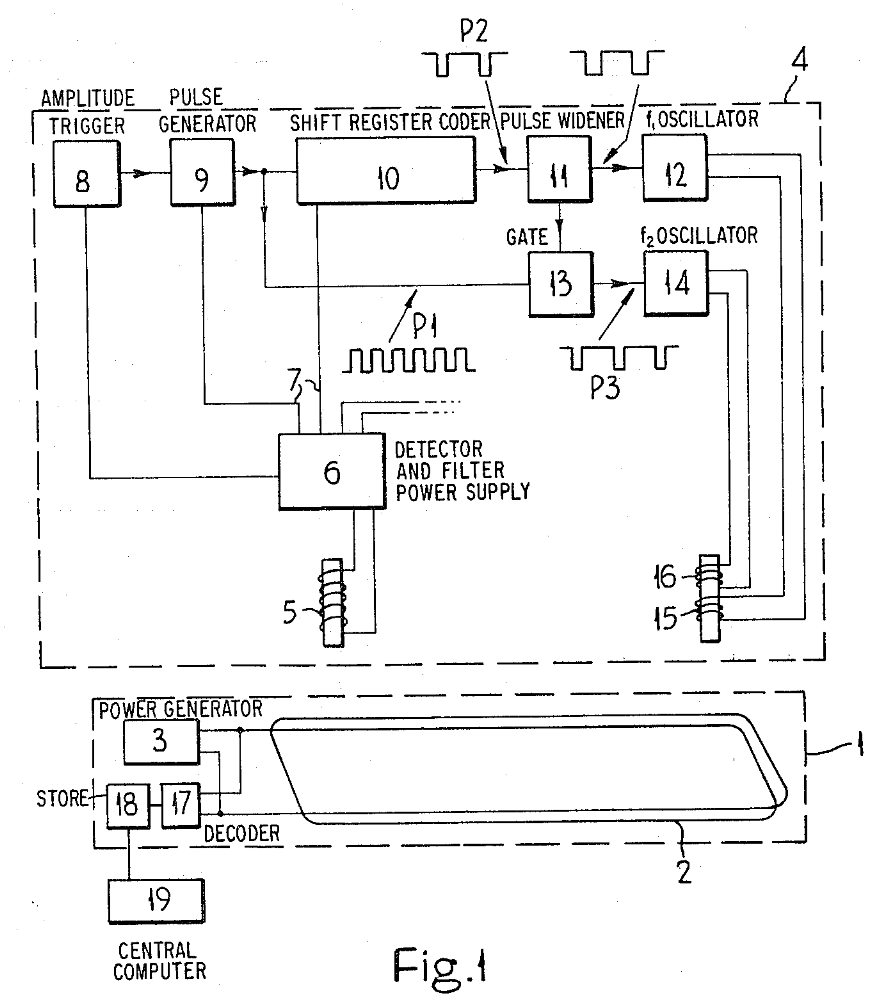

This invention relates to object identification systems and especially to systems for identifying and recording the passage of moving objects such as road or railway vehicles.

According to the invention a system for identifying and recording the passage of moving objects comprises a control means located at a fixed position adjacent to the path of the objects and, on each of said objects, a transponder unit including means for producing oscillations at two or more different frequencies and a selector device operable in response to a signal from the control means, on the passage of the object past the said position, to actuate the oscillator means in a selected order to produce pulses of output oscillations of the different frequencies in a sequence representative of the object, the arrangement including also, at said fixed position, a recording means designed to pick-up and record the sequence of oscillations.

By arranging that the sequence of the different oscillations is different for the different objects the recording and identification of the objects by the recording means can readily be achieved. Provided that only a small number of different frequencies are employed these can in general be widely separated thereby avoiding the need for a high degree of frequency, and hence component, stability, and for most applications of the invention two frequencies only will be found sufficient in practice to ensure adequate identification of the objects, by the use of a suitable binary code.

The output from the transponder units may, for example, be in a binary coded decimal form representing the numbers of the objects on which they are mounted, each figure of a number being represented by a constant number of pulses made up of two different frequencies and arranged in an appropriate sequence. In such a case each figure of the number is conveniently represented by a total of four pulses, each consisting of oscillations of one of the two frequencies and arranged in a predetermined sequence representative of that particular figure.

For example with pulses of one frequency representing "1" of a binary code and the other frequency "0," the number 123456 in binary coded decimal form may be represented by 1000/0100/1100/0010/1010/0110/.

In order to avoid the necessity for mounting power supplies in the objects themselves, each control means is conveniently associated at said fixed position with signal transmitting means, each transponder unit then including means for receiving the signal produced by said means and for developing therefrom a direct current of sufficiently high voltage for operating the oscillator means and producing the said sequence of output oscillations.

For example the transmitting means might comprise a conducting loop extending along the path of the objects at the fixed position, and arranged to be fed, in use of the arrangement with modulated impulses or a continuous alternating current signal, each transponder unit then including at least one coil disposed so that an alternating E.M.F. is induced in it during the passage of the object past the loop, together with rectifying means for converting the induced signal to a direct current.

The signal for operating the selector device may be an electrical signal, and in such a case is conveniently the signal from which the direct current providing the transponder power supply is developed, the transponder unit including a trigger device for initiating the operation of the selector when the voltage of the direct current supply reaches a given amplitude.

Alternatively each selector device might be responsive to light or infrared signals, the control means then including a projector arranged to direct one or more beams of light or infrared radiations towards the path of the objects, and the selector device being positioned on the respective object so as to intercept the beam or beams as the object travels past the control means. In one such arrangement the selector device comprises a plate having a series of openings therein with photo-responsive elements disposed behind the openings so as to receive the light or infrared radiations in a sequence determined by the openings as the object moves past the beam or beams and the elements being connected so as to actuate the oscillator means in the appropriate sequence. An optical system located behind the openings can be used to direct the light or infrared radiations onto the photoresponsive element if desired.

The openings in the plate are conveniently in the form of slots extending transverse to the direction of movement of the object on which the plate is mounted. Alternatively, round holes could be used.

It is often advantageous to arrange for the spaces between adjacent slots or holes to be large compared with the widths of the slots or holes themselves, since the orientation of the slots or holes with respect to the direction of movement of the object is less critical than in the case where the width of the spaces between the slots or holes are comparable with the width of the slots or the diameter of the holes themselves.

Optical means of suitable kind can be used to advantage to enable the spacing between the slots or holes and hence the overall length of the plate accommodating the slots or holes to be increased whilst avoiding the necessity for using an excessively long photocell assembly. Thus where visible radiations are employed the light passing through the slots could be collected and fed on to a relatively small photocell by means of a suitable optical reducing system, utilizing for example tapered blocks of transparent material or bundles of glass fibers as employed in known fiber-optics systems.

In order to eliminate the risk of the oscillator means being operated in an incorrect sequence by stray radiations, and therefore passing the wrong information to the recording means, the beam or beams of light or infrared radiation are conveniently modulated at an appropriate frequency and the signals produced by the photoresponsive devices passed through appropriate filter circuits.

Alternatively, a narrow intense beam of unmodulated visible light or infrared radiation may be employed, and a level discriminator used on the transponder unit for permitting only signals above a predetermined intensity to be fed from the photoresponsive means to the oscillator means for preventing the operation of the unit by stray radiations. In such an arrangement the radiation beams are preferably directed upwards, the plate and photoresponsive means being orientated accordingly. A hood may be provided for reducing still further the possibility of interference for stray ambient radiations. The use of a beam of infra-red radiations with photoresponsive means having a low response to visible light is of particular advantage in such arrangements. A radiation source in the form of a laser or similar device giving a particularly narrow and intense beam of radiations may be employed for at least some applications of the invention.

The oscillator means might be provided by a corresponding number of different oscillators arranged to be energized in turn in the appropriate sequence, or by means for producing a frequency shift of a common oscillator.

The system might include a number of control and recording means located at a number of different fixed key positions along the path of movement of the objects, the information received by the passage of objects past the different positions being fed to control data handling and processing equipment, enabling a complete record of the movement of all the objects to be readily obtained.

Figure 2:
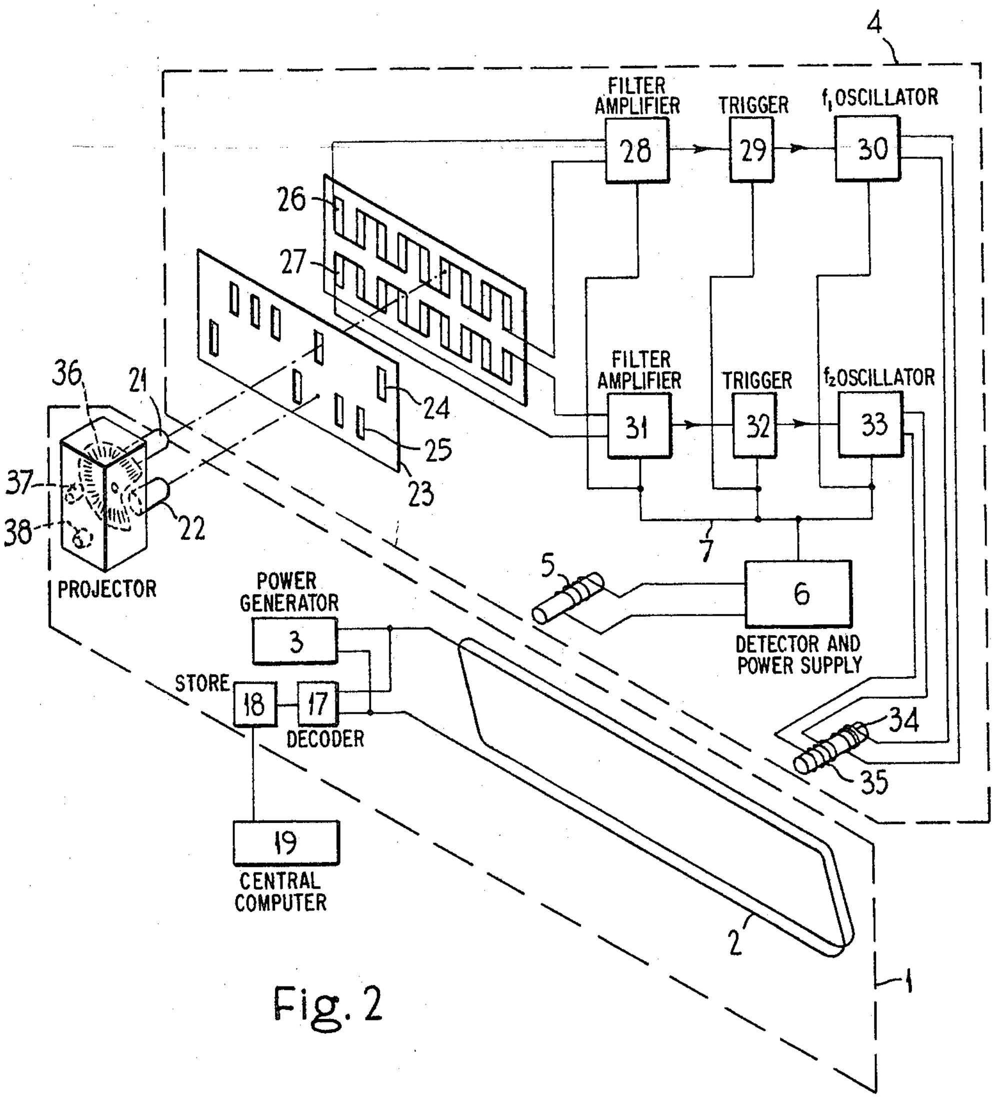

Such an arrangement can be used for the identification and control of road or rail vehicles, for example goods wagons on railways, and two different embodiments of the invention designed for this purpose will now be described by way of example with reference to the accompanying schematic drawings, in which FIGURE 1 shows the essential details of one form of system in accordance with the invention in which the vehicle oscillator code switching is effected by a pre-coded shift register, and FIGURE 2 shows the essential details of another system in accordance with the invention in which the vehicle oscillator code switching is effected by photo-responsive means excited by stationary light beams projected from the trackside control means.

Referring first to FIGURE 1 the system illustrated therein comprises a trackside unit 1 incorporating a conducting loop 2 which is arranged to be fed, in use of the unit, with a continuous alternating current signal, or with suitably-modulated high-frequency impulses, from a generator 3, the loop extending some distance along the track closely adjacent to it.

Each wagon carries a transponder unit 4 incorporating a small ferrite-cored receiver coil 5 which is so positioned that an alternating E.M.F. is induced in it on the passage of the wagon past the trackside loop 2. The coil is coupled to a detector and filter stage 6 of any convenient construction arranged to convert the alternating current signal produced in the coil to rectified current which acts as a power supply for the rest of the units in the transponder, only some of the power supply leads 7 being indicated in the drawing. In addition when the D.C. voltage reaches a selected amplitude it is arranged to actuate a trigger device 8 giving rise to the operation of a pulse generator 9 designed to produce pulses P1 having a unity mark/space relation.

The transponder unit also includes a multistage shift register 10, each stage of which represents in binary form a different figure of the wagon number and gives output pulses corresponding to the respective figure; the pulse representative of the different figures are fed in sequence to a pulse widener circuit 11 and then to an osciallator 12 designed to be operative only on the receipt of the pulses, and to produce output oscillations of frequency $f1$. In the drawing the pulses P2 shown being fed to the pulse widener 11 are representative of the FIGURE 5 in binary form. Widened pulses from the pulse widener 11 are also fed to an inhibit gate and inverter 13 and inhibit the passage of pulses from the pulse generator 9 to a second pulse-controlled oscillator 14 tuned to a frequency $f2$, the latter oscillator thus being operated by the pulses P3 passed by the inhibit gate only in the intervals between the pulses of output oscillations from the oscillator 12. Each figure is then represented by a total of four pulses of oscillations from the different oscillators 12, 14 in an appropriate sequence.

The oscillators 12 and 14 feed ferrite loaded coils 15 and 16 respectively which are also inductively coupled with the fixed loop 2 at the trackside, as the wagon is carried past the loop.

Pulsed E.M.F.'s modulated at the frequencies $f1$ and $f2$ of the oscillators 12 and 14 are induced in the loop 2 and are decoded by means of a suitable decoder 17, which thus gives an output representative of the vehicle number, this being recorded by a store 18.

The store 18 is conveniently arranged to retransmit this information to a central data processing and handling computer 19 common to a plurality of lineside units disposed at appropriate key positions, thereby facilitating the movement identification and control of the wagons over the entire railway system.

The second system which is illustrated in FIGURE 2 also comprises a fixed lineside unit 1 incorporating a conducting loop 2 extending some distance along the track and arranged to be supplied in use of the unit with a continuous alternating current-signal or with modulated impulses from a generator 3.

The unit incorporates a projector device having a pair of optical systems 21, 22 each arranged to direct a narrow light beam towards the track from a light source 37 or 38 modulated by a rotatable slotted chopper disc 36 shown broken away at the region of the optical system. On each wagon there is mounted a transponder unit 4 incorporating a slotted code plate 23 having two rows of slots 24, 25 located one above the other and positioned so that as the wagon passes the light beams each beam is directed in turn through the different slots of a respective row on to photo-responsive elements 26, 27 located behind the slots.

The top row of slots represent the vehicle recognition number in binary coded decimal form, and the lower slots the complement of that number (i.e. containing "1" 's where the other contains "0" 's, and vice versa); each figure of the number is constituted by an appropriate arrangement of four slots 24, 25, but only some of the slots have been illustrated in the drawing.

The photo-responsive elements 26 corresponding to the top row of slots are connected, through an amplifier stage 28, including a pass-filter tuned to the modulation frequency, to a trigger device 29 controlling the operation of an oscillator 30 which is tuned to a frequency $f1$, the latter being operative only when the trigger device 29 is actuated by the pulses produced each time an element 26 is illuminated by the light beam passing through a respective slot 24. Similarly the photoresponsive elements 27 corresponding to the lower row of slots 25 are connected through an amplifier stage 31, also including a pass-filter tuned to the modulation frequency, to a second trigger device 32 controlling the operation of another oscillator 33 tuned to a frequency $f2$.

Each oscillator 30, 33 is connected to a ferrite loaded coil 34, 35 which coils are inductively coupled with the lineside loop 2 as the wagon carrying the transponder unit travels past the lineside unit 1. Thereby, as the wagon moves past the lineside unit 1, information corresponding to the wagon identification number transmitted to the loop is fed to a decoder 17 and store 18, and therefrom to a control data processing and handling computer as in the embodiment previously described.

The D.C. power supply for operation of the transponder units is again obtained by means of a ferrite cored receiver coil 5 carried by the transponder unit and disposed so that an alternating E.M.F. is induced in it on the passage of the wagon past the trackside loop 2, the E.M.F. being rectified by means of a detector and filter stage 6, to produce direct current which is fed to the respective units by leads 7.

In a modification of this latter arrangement an optical reducing system, utilizing for example bundles of glass fibers or tapered transparent blocks, is employed for feeding the light passing the slots on to the photoresponsive elements. In this way the spacing between the individual slots may be increased without correspondingly increasing the length of the photo-responsive element assembly, which has the advantage of rendering the alignment of the slots at right angles to the direction of movement of the wagons less critical than in the case where the width of the spaces between the slots is comparable with the width of the slots themselves.

To reduce the amount of dirt accumulating on the parts of the optical system lying immediately behind the slots in the code plate these parts are conveniently spaced a short distance from the code plate. Contamination by dust and dirt may also be further reduced by arranging the transponder units on the railway wagons with the slotted code plates facing directly downwards, the projector device being located so as to direct the light beams upwards towards the code plates of passing wagons.

It should be noted that in a scheme of this kind it is not necessary for the projected beams to be vertical. The beams can be at an inclined angle thus allowing the projector "window" to be protected from dust and dirt.

In a further modification of the arrangement illustrated in FIGURE 2 the projector device is arranged to direct narrow beams of infrared radiation upwards, and the transponder units on the wagons are disposed accordingly. The photoresponsive elements are responsive to the infrared radiations produced, and between the elements and the oscillators there are provided level discriminators for permitting operation of the oscillators only when the signals attain a predetermined amplitude, thereby reducing the possibility of the transponder being actuated by stray ambient radiations. A hood is provided around the transponder further to eliminate possible interference of the transponder by stray ambient radiations.

The transponder units in these modified arrangements are conveniently located directly beneath the wagons to avoid the possibility of snow or ice obscuring the code plates.

In yet a further modification of the arrangement illustrated in FIGURE 2 incorporating a selector device in the form of a plate having a series of openings therein and photoresponsive means associated with the openings, the projector device of the lineside unit is dispensed with and the transponder unit itself incorporates illuminating means located on the opposite side of the plate to the photoresponsive means and so constructed and arranged that, in response to an electrical signal from the control means, the effective light source of the illuminating means is caused to traverse the plate so as to illuminate the photoresponsive means in a sequence determined by the openings in the plate. The illuminating means and the photoresponsive means can be located within a closed opaque housing, thereby avoiding the possibility of the transponder unit being actuated by stray light. The illuminating means in such an arrangement is conveniently in the form of one or more glow discharge devices of the kind used for indicating purposes in which the glow discharge can be made to move progressively within the envelope on the application of suitable control signals, the discharge device or devices being appropriately positioned with respect to the openings in the plate.

Although the invention has been described with reference to railway wagon recording equipment, it could also be advantageously applied to recording and controlling the movement of other bodies of a similar nature, for example, omnibuses, or other kinds of moving objects.

It will be understood that the different stages of the transponder and lineside units, which have been shown in block form in each of the figures for simplicity, may be constructed in any suitable manner as will be apparent to those skilled in the art of electronic engineering and that other methods of developing output oscillations indicative of the wagon number could alternatively be employed.

It will also be appreciated that the invention includes within its scope the individual transponder units designed for mounting on moving objects in a system according to the invention, and also the individual control and recording means designed for mounting in fixed positions adjacent to the path of the objects.

I claim:

1. A system for recording the identity of a moving object as it passes a fixed position adjacent to its path of travel, said system comprising a control means located at said fixed position, a transponder unit on the object, said transponder unit being arranged to emit a coded output signal which is both initiated and received by the control means, the control means comprising means for emitting a transponder-initiating signal and pick-up and recording means for receiving and recording the coded transponder output signal, and the transponder unit including oscillator means for producing oscillations of two different frequencies and a selector device operable in response to the transponder-initiating signal from the control means to actuate the oscillator means in a selected order to produce pulses of output oscillations in a coded time sequence of the different frequencies, which sequence is representative of the object, the selector device of the transponder unit including a first oscillator and a first number of photo-responsive devices each connected to said first oscillator for causing the first oscillator to emit transponder output pulses of a first frequency when the photo-responsive device is excited, and a second oscillator and a second number of photo-responsive devices each connected to said second oscillator for causing the second oscillator to emit transponder-output pulses of a second frequency when the photo-responsive device is excited, said first and second numbers of photo-responsive devices being intercalated in a coded sequence of mutual spacings along the direction of travel of the object, and the control means including light projecting means arranged to direct at least one beam of light towards the object so as to be incident on said photo-responsive devices and excite them in succession as the object travels past the control means, and thereby cause the coded time sequence of output pulses of different frequencies to be emitted by the transponder unit.

2. A system according to claim 1, wherein the control means includes means for modulating the projected light beam at a selected frequency and wherein the transponder unit includes filter means connected between the photo-responsive devices and the oscillators which prevent output signals from the devices which are of lower frequency than said selected frequency from reaching and actuating the oscillators.

3. A system according to claim 1 wherein the light-projecting means of the control means is arranged to produce a narrow light beam of high intensity and wherein the transponder unit includes level discriminator means connected between the photo-responsive devices and the oscillators which prevent output signals from the devices which are below a predetermined level from reaching and actuating the oscillators.

4. A system according to claim 1, wherein in the transponder unit the first number of photo-responsive devices is arranged in a row, wherein the second number of photo-responsive devices is arranged in a row beneath the row of the first number of photo-responsive devices but in staggered code sequence with respect to the direction of travel of the object, wherein the whole of the said devices are covered by an opaque plate provided with two rows of slots corresponding to the two rows of photo-responsive devices with each slot arranged to permit light to pass only to the photo-responsive device associated with that slot, and wherein the control means the light projecting means is arranged to produce two vertically displaced light beams each incident on a different row of said slots as the object passes the control means.

5. A system according to claim 4, wherein in the transponder unit the plate slots, and photo-responsive devices associated therewith, counting those of both rows, are arranged in groups totalling four to each group reckoned along the row, each slot of one row in the group lying beneath or above, as the case may be, an imperforate region of the plate corresponding to the omission of a slot in the other row, and wherein in each group of four slots the mutual spacing of the slots in one row, being the same row for each group, define a digit in the binary code, reckoning the presence of a slot as one of the binary digits 0, 1 and the absence of a slot as the other of the said binary digits.

References Cited by the Examiner

UNITED STATES PATENTS

| | | | |
|---|---|---|---|
| 2,910,579 | 10/1959 | Jones et al. | 343—6.5 |
| 3,054,100 | 9/1962 | Jones | 343—6.5 |
| 3,072,899 | 1/1963 | Kliest et al. | 343—6.5 |
| 3,175,191 | 3/1965 | Cohn et al. | 340—164 |

OTHER REFERENCES

"Microwaves Identify Freight Cars," by Hamann et al., Control Engineering, vol. 9, No. 3, March 1962, pages 102–104 relied upon.

"21 Ways To Pick Data Off Moving Objects," by Barber, Control Engineering, vol. 10, No. 10, October 1963, pages 82–86 relied upon.

CHESTER L. JUSTUS, *Primary Examiner.*

P. M. HINDERSTEIN, R. D. BENNETT, *Assistant Examiners.*